United States Patent

Yamada

[15] 3,683,950
[45] Aug. 15, 1972

[54] COMPOSITE FLUID PRESSURE GOVERNOR

[72] Inventor: Katsuo Yamada, 910, Ichisawa-cho, Hodogaya-ku, Yokohama, Japan

[22] Filed: July 17, 1970

[21] Appl. No.: 55,669

[52] U.S. Cl. .................................... 137/54, 137/56
[51] Int. Cl. ................................... G05d 13/36
[58] Field of Search ............................. 137/54, 56

[56] References Cited

UNITED STATES PATENTS

| | | | |
|---|---|---|---|
| 3,568,696 | 3/1971 | Kubo | 137/54 |
| 2,889,844 | 6/1959 | McFarland et al. | 137/54 |
| 3,279,486 | 10/1966 | Duffy et al. | 137/54 |
| 3,322,133 | 5/1967 | Searles | 137/56 |
| 3,552,409 | 1/1971 | Michnay | 137/54 |

*Primary Examiner*—Robert G. Nilson
*Attorney*—McCarthy, Depaoli, O'Brien & Price

[57] ABSTRACT

A composite fluid pressure governor producing a pressure signal proportional in magnitude to the speed of rotation of a rotary member such as an output shaft of an automatic power transmission of a motor vehicle, having primary and secondary valve units having pressure regulating characteristics that are different from each other, one of the valve units being a switch-over or shuttler valve whereby a fluid pressure is passed when a centrifugal force resulting from the rotation of the rotary member increases to a predetermined point and shut off when the centrifugal force decreases to a point sizeably lower than the aforesaid predetermined point, the other of the valve units being a pressure modulator valve which delivers a fluid pressure varying in accordance with the revolution speed of the rotary member. The two valve units are mounted 180° out of phase with respect to each other on a horseshoe-shaped governor body so that the governor structure can be mounted with utmost ease on the rotary member during assembly.

5 Claims, 5 Drawing Figures

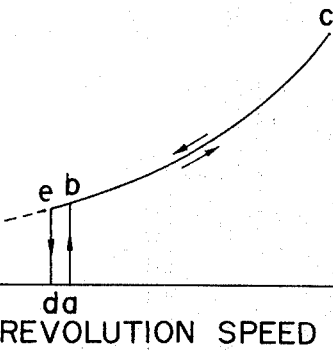
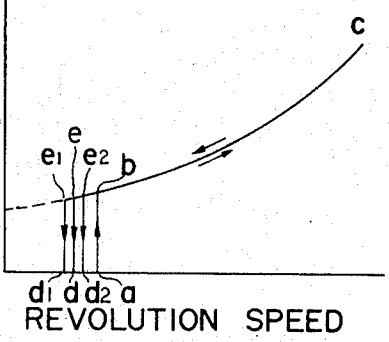
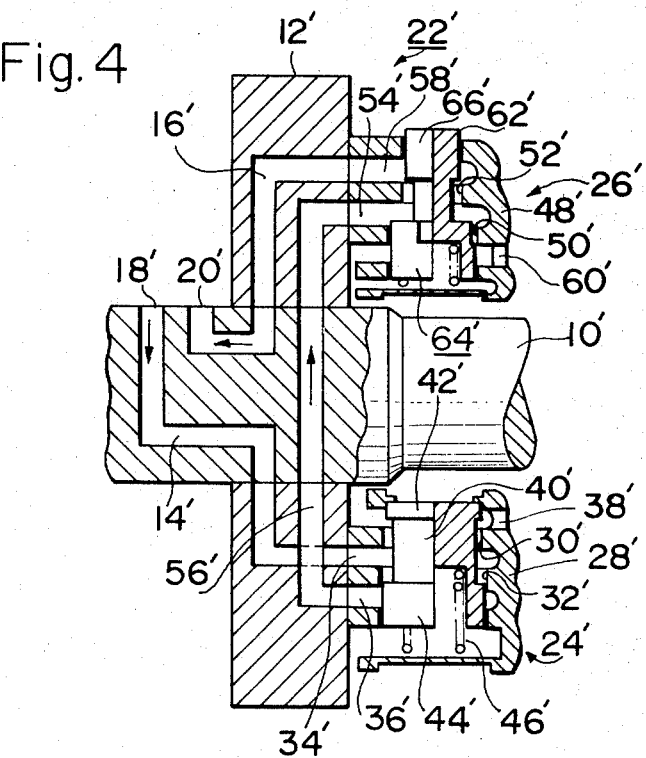

COMPOSITE FLUID PRESSURE GOVERNOR

This invention relates to a fluid pressure governor and, more particularly, to a composite fluid pressure governor which is adapted to produce a pressure signal proportional in magnitude to the speed of rotation of a rotary member. The fluid pressure governor proposed by this invention is specifically suited for use with an automatic power transmission of a motor vehicle.

An object of the invention is to provide an improved fluid pressure governor of the type which has two cooperating valve means that are responsive to a centrifugal force caused by the rotation of a rotary member on which the governor is mounted, whereby a governor pressure with combined regulating characteristics of the two valve means is produced.

Another object of the invention is to provide a fluid pressure governor in which the transitional point at which the governor pressure is cut off during deceleration is retarded from the transitional point at which the governor pressure is produced during acceleration, thus providing a "hysteresis" effect in the deceleration of the rotary member.

Still another object is to provide a fluid pressure governor in which the governor pressure rises and falls in a clear-cut fashion at the transitional points for acceleration and deceleration, respectively.

Still another object is to provide a composite fluid pressure governor the individual valve means of which are positioned about 180° out of phase with respect to each other so that the governor structure can be secured to a rotary member readily and in a simplified manner.

Further objects and advantages of the composite fluid pressure governor according to this invention will become more apparent from the following description and from the accompanying drawings, in which:

FIG. 3 is a graphical representation of the pressure regulating characteristics of the governor shown in FIGS. 2 and 3;

FIG. 4 is similar to FIG. 2 but illustrates a modified form of the fluid pressure governor; and FIG. 5 is a graphical representation of the pressure regulating characteristics of the governor shown in FIG. 4.

Figure 1:
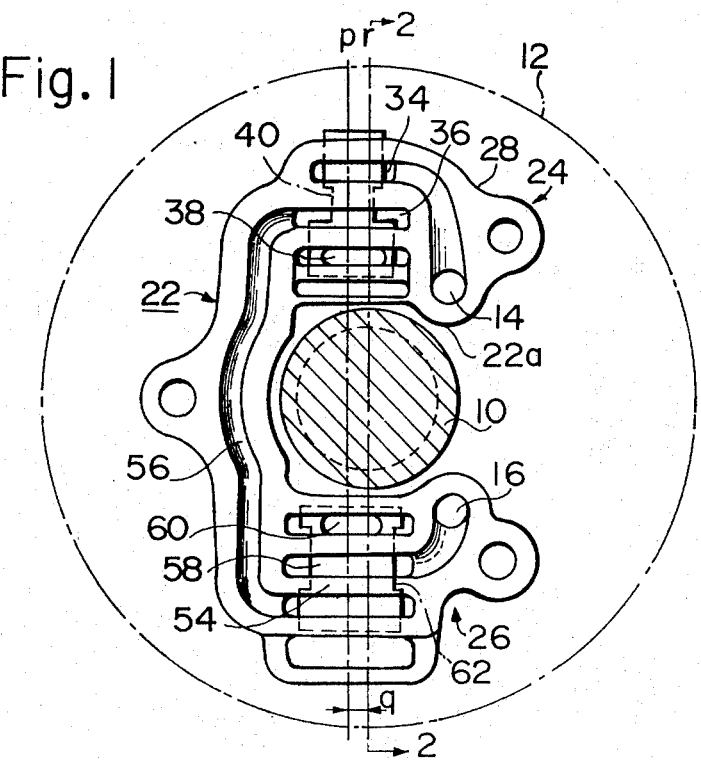
FIG. 1 is a front plan view of a fluid pressure governor according to the invention.
Figure 2:
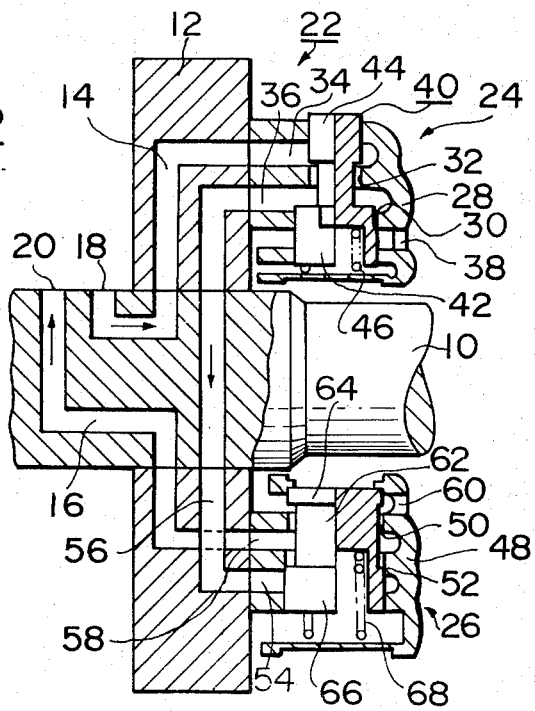
FIG. 2 is a section on line 2132 of FIG. 1.

Referring first to FIGS. 1 and 2, the fluid pressure governor (not numbered) is mounted on a rotary member which is represented by reference numeral 10. The rotary member 10 may be an output shaft of an automatic power transmission of a motor vehicle.

The governor is mounted for rotation with the rotary shaft 10 through an annular disc member or carrier 12 which forms part of the governor and which is indicated by a phantom line in FIG. 1. The carrier 12 is secured to the rotary member through a central bore (not numbered) formed centrally therein.

A control pressure passage 14 and a governor pressure passage 16 are formed in the rotary member 10 and the carrier 12, as illustrated. The control pressure passage 14 communicates with a source (not shown) of fluid pressure through a control pressure inlet 18 and feeds the fluid pressure constantly to the governor. The governor pressure passage 16, on the other hand, communicates through a governor pressure outlet 20 with means (not shown) to be controlled in response to the variation in the speed of rotation of the rotary member 10. Mounted on one side of the carrier 12 is a governor body 22. The governor body 22 includes a primary valve means 24 and a secondary valve means 26. The primary and secondary valve means 24 and 26, respectively, are positioned about 180° out of phase with respect to each other, namely on the opposite side of the rotary shaft 10 so that the governor body 22 has formed substantially centrally therein a generally horseshoe-shaped recess 22a which is opened partly and through which the governor body 22 is secured to the rotary member 10 readily and in a simplified manner.

The primary valve means 24 has a casing 28 having formed therein a radially extending bore (not numbered) on which are formed inner and outer annular lands 30 and 32. The casing 28 is provided with an inlet port 34 communicating with the control pressure passage 14, an outlet port 36 and an exhaust port 38 drained off to a sump (not shown).

A primary valve element 40, which is constructed as a spool valve, is radially movably accommodated in the bore of the casing 28. The primary valve element 40 has spaced inner and outer lands 42 and 44 which register with the cooperating internal lands 30 and 32, respectively. The inner land 42 is larger in diameter than the outer land 44 so that the former receives a greater fluid pressure than the latter during operation. The inner land 42 has formed therein a cavity (not numbered) in which is seated a spring 46 forcing the primary valve element 40 radially outwardly of the rotary member 10. The inlet port 34 and exhaust port 38 are kept closed by the outer and inner lands 44 and 42, respectively, so that no fluid pressure obtains in the outlet port 36 when the rotary shaft 10 is at rest and when no fluid pressure obtains in the inlet port 34.

The secondary valve means 26 which forms another half of the governor body 22 includes, similarly to the primary valve means 24, a casing 48 having formed therein a radially extending bore (not numbered) on which are formed inner and outer annular lands 50 and 52, respectively. The casing 48 is provided with an inlet port 44 communicating with the outlet port 36 of the primary valve means 24 through an intermediate passage 56 formed in the rotary shaft 10 and the carrier 12, an outlet port 58 communicating with the governor pressure passage 16, and an exhaust port 60 drained to a sump (not shown).

In the bore of the casing 48 is radially movably accommodated a secondary valve element 62 which is constituted as a spool valve, similarly to the counterpart 40 of the primary valve means 24. The secondary valve element 62 has spaced inner and outer lands 64 and 66 which register with the cooperating internal lands 50 and 52, respectively, of the casing 48. The outer land 66 is larger in diameter than the inner land 64 so that a greater fluid pressure is imparted to the former than to the latter during operation. The outer land 64 has formed therein a cavity (not numbered) in which is seated a spring 68 forcing the valve element 62 radially inwardly of the rotary member 10 as illustrated in FIG. 2. The inlet port 54 is thus closed by the outer land 66 with both the outlet port 58 and exhaust port 60 kept open when the rotary shaft 10 is at rest so as to produce no centrifugal force to be acted upon the governor body 22, with the result that no fluid pressure obtains in the outlet port 58.

When, now, a control pressure is passed to the inlet port 34 of the primary valve means 24 through the control pressure passage 14, then the valve element 40 is moved radially inwardly due to the difference in the areas of the lands 42 and 44 to a position in which the outward force exerted by the spring 46 is balanced with the inward force resulting from the defferential land diameters. It therefore follows that a fluid pressure, which is regulated by the fluid communication area defined by the internal annular land 32 and the outer land 44, is introduced into the intermediate passage 56 through the outlet port 36, as shown in FIG. 2.

Since, in this instance, the spring 46 is selected in such a manner that it overcomes a predetermined opposing effort resulting from the centrifugal force caused by the rotation of the rotary shaft 10 and from the fluid pressure determined by the differential diameters of the lands 64 and 66, the valve element 62 stays at rest even though a fluid pressure is present in the intermediate passage 56.

When, now, the rotary shaft 10 starts to rotate, a centrifugal force is exerted to the mass of the governor body 22 so that the primary and secondary valve elements 40 and 62, respectively, are subjected to a force that urges the elements radially outwardly. More specifically, the primary valve element 40 is moved gradually as the rotary member 10 rotates at an increasing speed and, as a consequence, the exhaust port 38 is fully closed by the inner land 42 and the inlet port 34 becomes wider open. The primary valve element 40 stops its outward displacement when the inward force resulting from the fluid pressure exerted to the differential lands 42 and 44 is balanced with the combined forces resulting from the centrifugal and spring actions. Thus, the fluid pressure is passed from the control pressure passage 14 to the intermediate passage 56 at an increasing rate. When, the speed of rotation of the rotary member 10 reaches a predetermined point with an increased fluid pressure obtaining in the intermediate passage 56, then the spring 68 yields to the centrifugal force exerted to the secondary valve element 62, which consequently is moved promptly outwardly to a position in which the outer land 66 permits the inlet port 54 to open and in which the inner land 64 permits the exhaust port 50 to close. The fluid pressure introduced into the intermediate passage 56 is now passed to the governor pressure passage 16 through the inlet and outlet ports 54 and 58, respectively, and is thereafter fed through the governor pressure outlet 20 to the aforesaid means to be controlled in response to the variation in the speed of rotation of the rotary member 10 which may be an output shaft of an automatic power transmission.

It will now be understood that a fluid pressure proportional to the speed, which is higher than a predetermined level, of rotation of the rotary member 10 is delivered from the fluid pressure governor that has been described and shown.

When, on the other hand, the speed of rotation of the rotary member 10 decreases from a certain elevated point, then the output pressure delivered from the secondary valve means 26 decreases accordingly because in this instance, the centrifugal force exerted to the primary valve member 40 decreases to cause the primary valve member 40 to move radially inwardly so that the fluid communication area defined by the outer land 44 and the internal annular land 32 is reduced.

As the speed of rotation of the rotary member 10 further decreases the governor pressure delivered from the secondary valve means 26 also decreases but, even when the revolution speed of the rotary member 10 reaches the aforesaid predetermined point (transitional point for acceleration), the secondary valve element 62 is not returned to its initial rest position. This is because of the fact that, when the revolution speed of the rotary shaft is in the vicinity of the predetermined point, a fluid pressure still obtains in the casing 48 of the secondary valve means 26 so that, due to the very difference between the areas of the inner and outer lands 64 and 66, the secondary valve element 62 remains subjected to an outward force resulting from the fluid pressure and can not be returned to its initial relaxed position.

The secondary valve element 62 is moved to a position to close the inlet port 54 when the speed of rotation of the rotary member 10 reaches a point that is sizeably lower than the aforementioned transitional point for acceleration. This provides a "hysteresis" effect in the fluid pressure governor of the described type.

The performance characteristics of the governor which has been described and shown are illustrated in FIG. 3, in which the variation of the governor pressure in terms of the revolution speed of the rotary member 10 is indicated.

Referring to FIG. 3 as well as to FIGS. 1 and 2, when the rotary shaft 10 starts to rotate with a fluid pressure obtaining in the inlet port 34, then the valve element 40 of the primary valve means 24 opens wider to pass to the intermediate passage 56 a fluid pressure that is indicated by the revolution speed of the rotary member 10. In this instance, however, the valve element 62 of the secondary valve means 26 is held in a position to keep the inlet port 54 closed and, as a result, no fluid pressure is present in the governor pressure passage 16. As soon as the revolution speed of the rotary member 10 reaches a transitional point a (FIG. 3) which is predetermined, the secondary valve element 62 is now moved to a position to open the inlet port 54, permitting the fluid pressure in the intermediate passage 56 to pass through the inlet and outlet ports 54 and 58 so that a governor pressure is delivered as indicated by point b in FIG. 3. The governor pressure thus delivered increases as the revolution speed of the rotary shaft increases as indicated by the curve b–c. When the revolution speed of the rotary member 10 decreases and reaches the point a which is the transitional point for acceleration, the governor pressure does not nevertheless fall to zero but still continues to decrease if the revolution speed further decreases. Thus, it is at a lower point d of the revolution speed of the rotary member 10 that the governor ceases to supply the governor pressure as indicated by point 3, for the reason previously noted. Such "hysteresis" effect of the pressure regulating characteristics of the governor constitutes an outstanding aspect of this invention.

According to another outstanding aspect of the invention, as mentioned at the outset of this specification, the primary and secondary valve means 24 and 26, respectively, are positioned about 180° out of phase with respect to each other and the governor body has a horseshoe-shaped recess 22a which is opened partly, so that the governor as a whole can be secured to the rotary shaft 10 easily yet snugly therethrough.

If preferred, furthermore, the center line $p$ of the primary and secondary valve means 24 and 26, respectively, when seen in the end plan view of FIG. 1, may be deviated at a distance $q$ from a parallel line $r$ passing through the center point of the rotary member 10, as indicated in FIG. 1, whereby the area of the recess 22a is increased so that the governor body 22 can be mounted more easily on the rotary member or shaft 10.

In FIGS. 4 and 5 is illustrated another governor construction offering these and even other outstanding features. Similarly to the construction of FIGS. 1 and 2, this modified governor construction comprises a governor body with a primary governor valve means and a secondary governor valve means. Each of the valve means includes members and elements that have their counterparts in the structure of FIGS. 1 and 2 and, as such, the members and elements of the governor shown in FIGS. 4 and 5 bear the same reference notations as the corresponding members and elements of FIGS. 1 and 2, although prime notations are added thereto.

Notwithstanding the analogy in construction, the governor of FIGS. 4 and 5 is dissimilar to that of FIGS. 1 and 2 in that the control pressure is supplied through the passage 16 and the governor pressure is delivered from the passage 14, thus the fluid pressure being passed from the secondary valve means to the primary valve means.

Referring to FIG. 4, when a control fluid pressure is passed to the inlet port 34' of the primary valve means 24' through the control pressure passage 14', the valve element 40' receives a force toward the rotary shaft 10'. Since, in this instance, the spring 46' is so selected as to overcome a predetermined force which is higher than the fluid pressure exerted to the valve element 40', the valve element 40' remains in a position to close the outlet port 36' and open the exhaust port 38' with the result that no fluid pressure is passed over to the intermediate passage 56'.

When, now, the rotary member 10' starts to rotate, a centrifugal force is exerted to the governor body 22' so that the primary and secondary valve means 24' and 26', respectively, are urged outwardly of the rotary member 10'. At the moment the speed of rotation of the rotary member 10' reaches a predetermined point (transitional point for acceleration), the valve element 40' is moved radially outwardly to a position in which the outlet port 36' is opened and the exhaust port 38 is closed. The fluid pressure staying in the control pressure passage 36' is thus admitted into the intermediate passage 56' and is applied to the valve element 62' of the secondary valve means 26' through the inlet port 54'. Because, in this instance, the valve element 62' has the inner land 64' which is larger in diameter than the outer land 66', the valve element 62' is moved radially inwardly to a position in which the outlet port 58' is opened. Thus, the fluid pressure introduced into the inlet port 54' is passed to the governor pressure passage at a rate determined by the fluid communication area which is defined by the internal annular land 52' of the casing 48' and the outer land 66' of the valve element 62', such fluid communication area being increased as the rotary shaft 10' is rotated at an increasing speed.

A fluid pressure that is proportional in magnitude to the revolution speed of the rotary member 10' is delivered from the governor and is used to control the aforesaid means which may be servos of clutches and brakes of an automatic transmission.

As the speed of rotation of the rotary member 10' decreases, then the output or governor pressure delivered from the governor decreases accordingly. When, however, the revolution speed reaches the point at which the control pressure is passed to the intermediate passage 56' during acceleration of the rotary member, the valve element 40' is not returned to its initial rest position, similarly to the governor structure of the first embodiment. The valve element 40 is moved to a position to close the outlet port 36' when the revolution speed of the rotary member 10' decreases to a point lower than the aforesaid transitional point for acceleration. Such a "hysteresis" effect of the governor will be better understood from observation of the curves $b$–$c$ and $c$–$3$ in FIG. 5 which is essentially similar to FIG. 3.

The construction and arrangement of the governor shown in FIG. 4 provides such an advantageous performance characteristics that, since the control pressure is applied direct to the valve means 24' which is a switch-over valve (or a shuttler valve as is sometimes termed), the revolution speed of the rotary member 10' at which the valve element 40' is moved to a position to close the outlet port 36' varies with the level of the control pressure transferred from the control pressure passage 14'. In other words, the outward force imparted to the valve element 40' due to the differential land diameters depends upon the level of the supplied control pressure. This means that, if a higher control pressure is supplied to the control pressure passage 14', the valve element 40' will be returned to its initial rest position at a lower revolution speed of the rotary member 10', and vice versa. As shown in FIG. 5, if a higher fluid pressure is passed to the control pressure passage 14', then the valve element 40' is returned to a position to close the outlet port 36' when the revolution speed of the rotary member 10' is reduced to a point $d_1$ which is lower than the normal point $d$ as shown at point $e_1$ in FIG. 5. If, conversely, a lower fluid pressure is introduced into the control pressure passage 14', the valve element 40, is returned to the initial position when the revolution speed of the rotary member 10' is reduced to a point $d_2$ which is higher than the point $d$ as shown in point $e_2$. It will thus be understood that the second embodiment of the governor structure according to this invention is advantageous where it is desired to have the revolution speed of the rotary member 10' to shut off the governor pressure varied in accordance with the control pressure supplied to the governor.

What is claimed is:

1. A fluid pressure governor for establishing a governor pressure in accordance with the speed of rotation of a rotary member, comprising a governor carrier mounted for rotation with said rotary member; a governor body supported by and rotatable with said carrier; a primary valve means which is carried by said governor body and which includes a primary valve casing having therein a bore having in its wall internal lands, an inlet port, an outlet port and an exhaust port, a primary valve element radially movably accomodated in said bore of said primary valve casing, said primary valve element having spaced inner and outer lands which register with and cooperate with said internal lands, said inner land being larger in diameter than said outer land, and a spring biasing said primary valve element radially outwardly of said rotary member; a secondary valve means which is carried by said governor body and which includes a secondary valve casing having therein a bore having in its wall internal lands, an inlet port, an outlet port and an exhaust port, a secondary valve element radially movably accommodated in said bore of said secondary valve casing, said secondary valve element having spaced inner and outer lands which register with and cooperate with said internal lands, said inner land of said secondary valve element being smaller in diameter than said outer land thereof, and a spring biasing said secondary valve element radially inwardly; a control pressure passage communicating a fluid pressure source and said inlet port of said primary valve means for introducing a control pressure thereinto; an intermediate passage communicating said outlet port of said primary valve means with said inlet port of said secondary valve means; a governor pressure passage communicating said outlet port of said secondary valve means; said control pressure, intermediate and governor pressure passages being formed in said governor body, said primary valve means regulating a control pressure by a fluid communication area defined by said outer land of said primary valve element and one of said internal lands of said primary valve casing which cooperates with said outer land to generate a governor pressure in said outlet port of said primary valve means, said fluid communication area depending on the action of said spring of said primary valve means, a centrifugal force created by the speed of rotation of said rotary member and a radially inward fluid pressure force due to the difference in the areas of said inner and outer lands of said primary valve element, said outer land of said secondary valve element closes said inlet port of said secondary valve means to stop the supply of a governor pressure to said outlet port thereof and at the same time said inner land of said secondary valve element opens said exhaust port of said secondary valve means thereby to communicate said outlet port thereof and said exhaust port until the speed of rotation of said rotary member increases to a predetermined value and opens said inlet port to introduce a governor pressure into said outlet port of said secondary valve means and at the same time said inner land of said secondary valve element closes said exhaust port when the speed of rotation of said rotary member increases to said predetermined value, said outer land of said secondary valve element closes said inlet port of said secondary valve means to stop the supply of a governor pressure to said outlet port thereof and at the same time said inner land of said secondary valve element opens said exhaust port when the speed of rotation of said rotary member decreases to a certain value lower than said predetermined value.

2. A fluid pressure governor according to claim 1, wherein said primary and secondary valve means are positioned substantially 180° out of phase with respect to each other.

3. A fluid pressure governor according to claim 2, wherein said governor body has a central recess through which said governor body is snugly mounted on said rotary member.

4. A fluid pressure governor according to claim 2, wherein the line connecting the centers of said primary and secondary valve elements, when seen in front plan, is deviated from the line parallel thereto and passing through the center of said rotary member.

5. A fluid pressure governor according to claim 1, wherein said rotary member is an output shaft of an automatic power transmission of a motor vehicle and said governor pressure is carried to control means of said transmission.

* * * * *